United States Patent

Salmassy et al.

[15] 3,704,363

[45] Nov. 28, 1972

[54] STATISTICAL AND ENVIRONMENTAL DATA LOGGING SYSTEM FOR DATA PROCESSING STORAGE SUBSYSTEM

[72] Inventors: Oscar E. Salmassy; Robert E. Sullivan, both of San Jose, Calif.

[73] Assignee: International Business Machines Corporation, Armonk, N.Y.

[22] Filed: June 9, 1971

[21] Appl. No.: 151,503

[52] U.S. Cl. ..............235/153, 324/73 R, 340/172.5, 444/1

[51] Int. Cl. ..............G06f 11/00

[58] Field of Search ........235/153; 340/146.1, 172.5; 324/73 R; 444/1

[56] References Cited

UNITED STATES PATENTS

| | | | |
|---|---|---|---|
| 3,496,549 | 2/1970 | Tong | 340/146.1 A X |
| 3,519,808 | 7/1970 | Lawder | 235/153 |
| 3,599,091 | 8/1971 | Warner | 324/73 R |
| 3,609,704 | 9/1971 | Schurter | 340/172.5 |

*Primary Examiner*—Charles E. Atkinson
*Attorney*—Hanifin and Jancin and Peter R. Leal

[57] ABSTRACT

A method and apparatus for maintaining a statistical data record of usage and error information for each physical device and for physical storage volumes within each physical device, in a data storage subsystem. Usage information provides an accumulated count of the total number of various types of usage, while error information provides an accumulated count of the total number of various types of errors encountered during the usage. All such information is identified by physical device and is further identified by physical ID of a storage volume mounted on the device. The usage/error information is off-loaded to a storage area of the using system each time one of the usage or error counts reaches a predetermined threshold, and can be off-loaded at end-of-day, or at a physical volume change time in order to allow a summary by time period and by storage volume ID. An environmental data logging mode is initiated when an intolerable amount of errors of a given type is encountered, and for the next predetermined number of times that the particular type of error which initiated logging occurs, detailed sense information is recorded by the subsystem and transmitted to the system. Statistical and environmental data is summarized for use by system maintenance personnel for diagnostic and maintenance purposes.

3 Claims, 8 Drawing Figures

INVENTORS.
OSCAR E. SALMASSY
ROBERT E. SULLIVAN

BY Peter R. Leal
ATTORNEY

STATISTICAL AND ENVIRONMENTAL DATA LOGGING SYSTEM FOR DATA PROCESSING STORAGE SUBSYSTEM

BACKGROUND OF THE INVENTION

In modern day computer systems a central processing unit, or CPU, processes instructions and data, most of which, due to main storage limitations within the CPU, are stored in one or more peripheral storage devices external to the CPU. Generally, a CPU is connected to a data channel which, in turn, is connected to the peripheral storage devices by way of a storage control unit. An operation performed at the CPU or channel is said to be performed at the system level, while an operation performed at the peripheral storage device or storage control unit is said to be performed at the subsystem level.

A request for transfer of data between a peripheral storage device and the CPU is generally in the form of a command stored in CPU main storage, the command being termed a channel command word (CCW). A plurality of such requests in sequence are termed a chain of CCW's which result in a plurality of operations such as data transfers between the peripheral storage device and the CPU. In the past, whenever an error was encountered during data transfer from a chain of CCW's, the storage control unit would signal a data check communication to the channel, resulting in an interrupt to the CPU with the result that the entire chain of CCW's would be re-executed from the beginning, in hopes of achieving data transfer without error. Recently, improvements have been made to the system under discussion, wherein when an error occurs in an operation resulting from the chain of CCW's, the storage control unit has the ability to retry that particular CCW without re-executing the entire chain of CCW's and in such a manner that the retry of the CCW appears to the system merely as a normal CCW fetch, as opposed to being a system interrupt. While this improvement has had the effect of significantly improving system throughput and efficiency, it has raised a problem in that now the system has no way of knowing the environmental status and statistical error and usage status of the peripheral storage devices, inasmuch as most errors are handled at the subsystem level, without system intervention.

In the system of the type under discussion, the peripheral storage devices are generally of the type having a removable storage medium termed a volume. For example, the peripheral storage devices may be rotating disk storage drives which have removable disk packs as the storage volumes; or they may be tape drives which have removable tapes as the storage volumes; or other like devices. This being the case, and taking rotating disk storage drives as an example, a disk pack may be written on a first drive and read from a second drive. Disk packs may be therefore interchanged from one drive to another to yet another. When an inordinate number of errors occur during a data transfer or other type operation to or from a given drive, the drive may become suspect as being in error. However, it is possible the error may actually be in the medium, i.e., in the disk pack itself. That is, the recording medium may have been damaged; or perhaps the pack was written on another disk drive which may have been out of tolerance through wear, for example, with the result that the pack is unable to be read from the disk drive on which it is currently mounted. Therefore, it is sometimes impossible to distinguish whether errors in data transfer to or from a given drive are due to the drive being in error or to the disk pack being in error.

SUMMARY OF THE INVENTION

The present invention avoids the above shortcomings by providing a statistical record of usage and error information for each physical device in a subsystem and for each physical volume on the physical device. Briefly, the invention provides counters for counting the number of bytes of data read and the number of access motions, for each physical device and correlates these to the number of correctable data errors, uncorrectable errors, and access motion (or seek) errors for a given physical volume within the physical device. When the number of errors of at least one type exceeds a threshold number as compared to usage of at least one type, the usage/error information is offloaded to the system by physical drive ID and Volume ID. Thus, by associating error information to volume and physical drive it is possible to infer that an error occurring in the subsystem is more likely in the physical volume or in a physical device. Likewise, this information is offloaded if a usage reaches its threshold without an error type exceeding its threshold.

Whenever offloading occurs due to error overflow, detailed diagnostic information is collected the next arbitrary number of times an error of the type causing the offloading is encountered, and such information is used for diagnostic purposes.

Other objects and attendant advantages of this invention will become appreciated as the same becomes better understood by reference to the following detailed description when considered in connection with the accompanying drawing.

Figure 1:
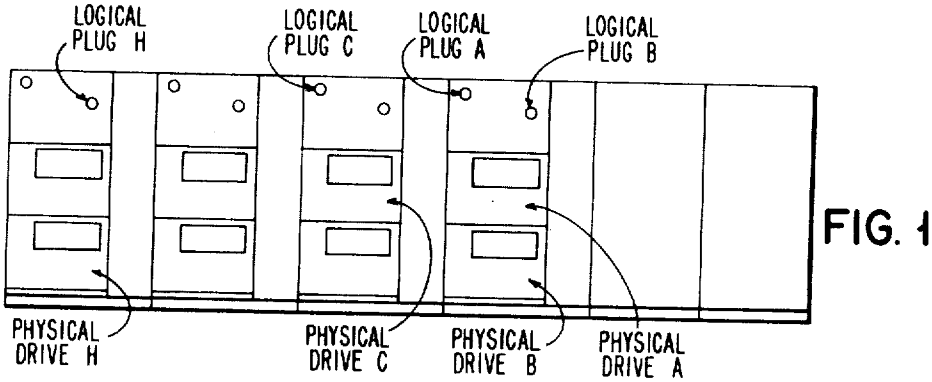
FIG. 1 is a representation of a storage subsystem within which the invention can be embodied.

Before beginning a description of the invention, it would first be well for background purposes to review information storage generally in one system in which the current invention may find use, it being recognized that the invention will also find use in other types of storage systems. Information is generally stored, in the system under discussion, on disk pack volumes on tracks, in records comprising three information fields: a count field, a key field, and a data field. The beginning of a record is indicated, for control purposes, by an address marker. Each address marker is preceded by a synchronization area to synchronize timing components used for reading. Each track is headed by a home address field for address identification and a track descriptor record to indicate the physical condition (such as defective or defect free) of the track. A detailed explanation of the manner in which information is stored in records of this type can be seen in U.S. Pat. No. 3,299,410 to J. R. Evans and assigned in common herewith.

When data errors are encountered in a system of this type, they are generally corrected by an error correction code (ECC) system, if possible, which supplies the displacement, or location, of the error in the information field, and the bit pattern useful in the correction of the error. Such errors are termed ECC correctable errors. Such a system is seen in copending application Ser. No. 874,234 by H. P. Eastman, filed Nov. 5, 1969, now U.S. Pat. No. 3,622,984, and assigned in common herewith. One way of applying such error correction is to retry the command if the detected error is in the relatively short home address, track descriptor record, or the count or key fields of any other record. The data in error can be temporarily stored in a buffer area in the storage control unit and corrected there by the ECC system. When the command has been retried and the drive properly oriented on the desired record on the track, the repaired data in the buffer is sent to the channel, the system now being ready to continue the CCW chain. On the other hand, if the error is in the data field in a record other than the track descriptor record, the data in error plus the displacement and the bit pattern can merely be sent directly to the system for correction there, since storage space for correcting a long data field in the control unit is prohibitive. It will be recognized by those of ordinary skill in the art that the above error correction procedure can be modified and changed according to the needs of the particular system within which the invention is embodied, without departing from the spirit and the scope of the invention.

On occasion, it may happen that an error may be encountered which is outside the correction capability of the error correction code being used. These are termed ECC uncorrectable data checks and an attempt is made to recover from this type of error by rereading the data by retrying the command during which the error was encountered, in hopes of obtaining correct or ECC correctable data. A process of command retry is seen in copending application Ser. No. 101,079 filed on Dec. 23, 1970 by R. L. Cormier et al. and assigned in common herewith. During retry of the command, if correct or ECC correctable data is not obtained after a given number or retries, it may be desirable, for the situation in which a disk storage is used, to offset the access mechanism off track a number of microinches in either direction and retry again in hopes of obtaining correct or ECC correctable data. For example, during command retry the access may be offset a certain number of microinches in a first direction and the command retried a number of times. It may be then reset the same number of microinches in the opposite direction and the command again retried a certain number of times. This would continue for various microinch displacements, according to the requirements of the particular storage system design. One method of doing this can be seen in copending U.S. Pat. application Ser. No. 665,836 filed Sept. 6, 1967, now U.S. Pat. No. 3,472,178, by R. K. Brunner et al., and assigned in common herewith.

Further, data records of the type under discussion may be recorded in such a manner that the particular sector of a disk nearest the beginning of the record can be determined and saved, for the situation in which the invention is embodied in a disk storage drive. The sector number is useful for several purposes, one of which is for environmental logging for ultimate use by the maintenance engineer at scheduled or unscheduled maintenance time. Means for recording and reading records of the type under discussion by sector numbers can be seen in co-pending application Ser. No. 875,137 filed on Nov. 10, 1969, now U.S. Pat. No. 3,629,860, by A. J. Capozzi and assigned in common herewith.

With the above as background information, the invention will now be described.

STRUCTURE AND METHOD

The present invention can be used in a storage subsystem such as one comprising a storage control unit and a number of disk drives, on each of which is mounted a disk pack or storage volume. Such a subsystem is seen in FIG. 1. Seen in that figure is a diagrammatic representation of a control unit and a group of disk drives. Disk drives are designated in two ways: by physical ID and by logical drive ID. With reference to FIG. 1, physical ID is fixed and can be seen by the designations Physical Drive A through Physical Drive H. However, for purposes of the system, physical drive A may not be the first drive on line but may be logically the third or the fourth, or some other numbered drive, on line. This is taken care of by the logical address plugs as shown. One such logical address plug for enabling the changing of the logical address of the physical drive can be seen in U. S. Pat. No. 3,453,567 entitled "Data Storage Module Selector Assembly" by J. B. Sampson, et al., and assigned in common herewith. Also, a third ID is used in the terminology of this invention, and this is the volume ID. That is to say, each disk pack which is mounted on a disk drive has a particular pack or volume ID which, for example, may be a six digit alphanumeric identifier recorded at track 0, cylinder 0, and used to identify the volume. It will be the function of the invention to ultimately produce statistics both by volume ID and by physical drive ID in order that, when an intolerable number of errors occur, the source of the error can be traced either to a physical drive or a volume. While the invention is being described in terms of a disk pack mounted on a disk drive, it will be readily apparent to those of ordinary skill in the art that the invention can also have application to a system having tape reels mounted upon tape drives, or other portable record media mounted to their driving elements.

Figure 2:
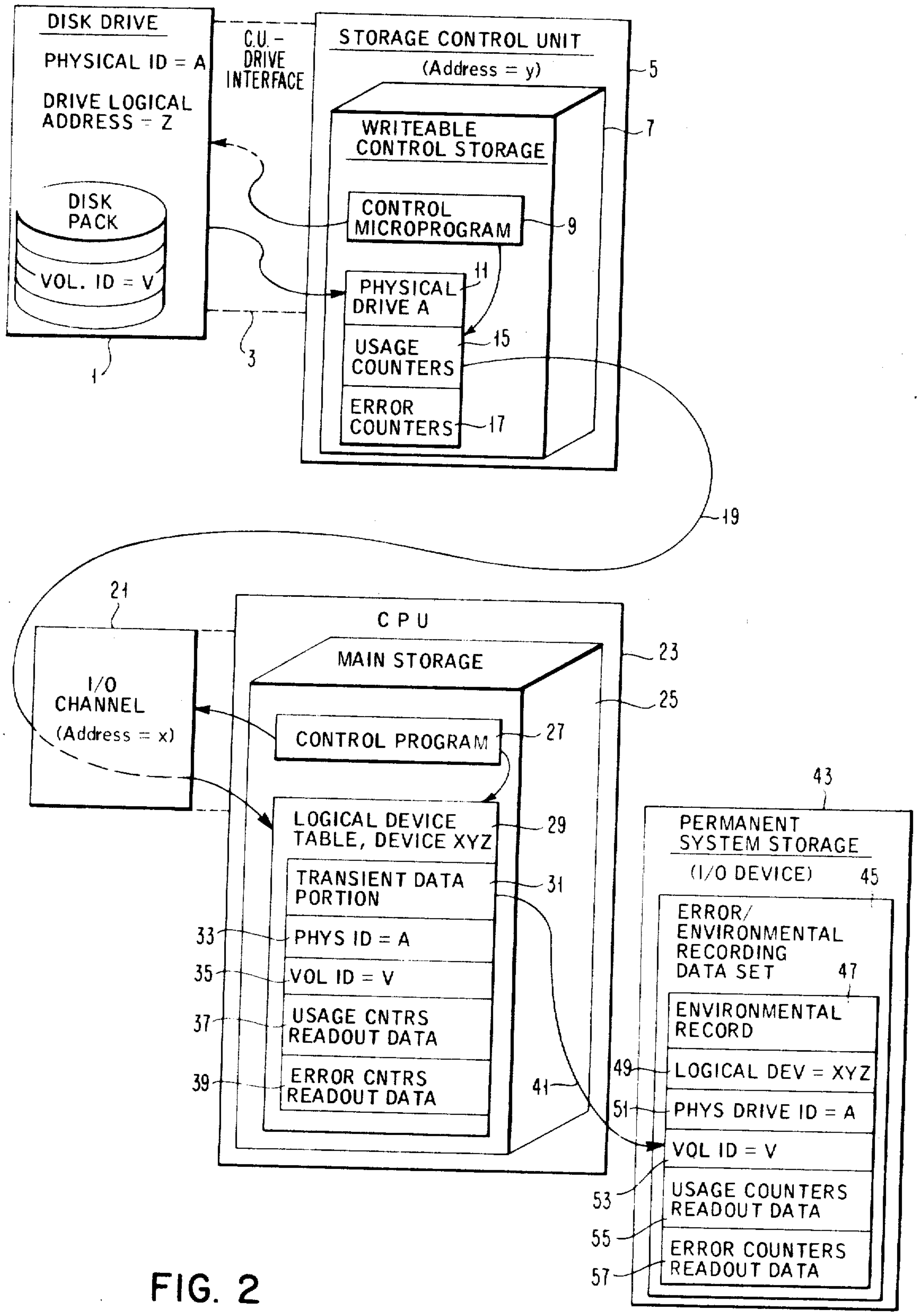
FIG. 2 is a representation of various parts of a data storage system and shows the manner in which the invention can be embodied therein.

Referring now to FIG. 2 there is seen an overview of the system in which our invention has application. At the subsystem level are seen a storage control unit 5 and one or more disk drives 1 connected together via a control unit-drive interface comprising control lines to and from both apparatus. Control unit 5 can be any of several known control units such as, for example, those seen in U.S. Pat. No. 3,544,966, to J. J. Harmon and copending application Ser. No. 888,482 to R. C. Day, filed Dec. 29, 1969, and now U.S. Pat. No. 3,623,022, both of which are assigned in common herewith. While the invention could have application to a control unit with a read only storage such as that in the Harmon patent, it will be explained in terms of a storage control unit having a writeable control storage unit 7 such as a monolithic integrated circuit control storage, an example of control operation of which is seen in the patent of Day, cited above.

With continued reference to FIG. 2, writeable control storage 7 has a control microprogram 9 and has an area for each logical drive on line for listing particular information from that logical drive. One such area can be seen from 11 in FIG. 2. This area is dedicated to the logical drive in current operation and contains the physical drive address, as well as the usage and error counters, to be discussed subsequently, for that logical drive.

Also seen in FIG. 2 is a CPU 23 and I/O channel 21. I/O channels suitable for use are well known in the art. Exemplary channels can be seen in U.S. Pat. No. 3,303,476 to J. T. Moyer, et al.; and U.S. Pat. No. 3,550,133 to L. E. King, et al., both patents being assigned in common herewith. The storage control, the I/O channel and the CPU are suitably connected by appropriate bussing and interface circuitry. CPU 23 has main storage 25 maintaining a control program 27 as well as a logical device table such as 29 for each device. Finally, the CPU is connected to a storage means 43 having storage area 45 for recording usage/error statistics and environmental data. Storage means 43 may be a disk drive used as permanent system storage.

USAGE/ERROR STATISTICS

Figure 3:
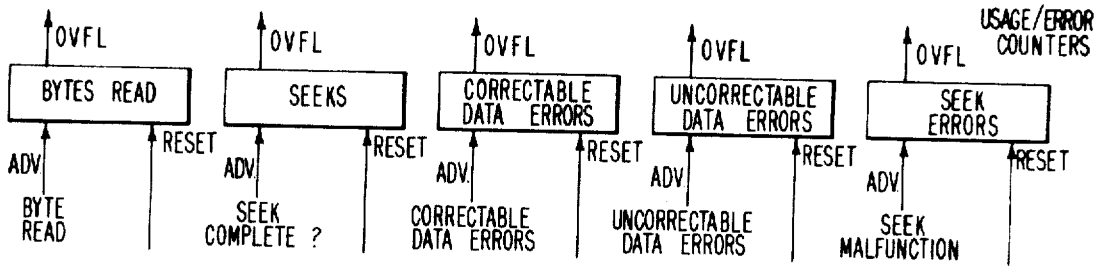
FIG. 3 is a representation of the error and usage counters of the invention.

Turning to FIG. 3 there is seen a group of usage/error counters. These counters count the number of seeks, the number of information bytes read (i.e., the usage, or usage parameters), the number of ECC correctable data errors, the number of ECC uncorrectable data errors, and the number of seek or access errors, per logical drive (i.e., the errors or error parameters). A threshold of a minimum number of usage for a given number of errors can be established. If the error threshold is reached before the usage threshold is reached, then the statistical information is offloaded to the system for ultimate use in maintenance procedures. One exemplary set of threshold values can be: $(2^{31}-1)$ bytes read before 512 ECC correctable errors or 64 ECC uncorrectable data errors; and $(2^{15}-1)$ access motions before 8 seek errors. Each counter is shown symbolically to have an advance line for incrementation and a reset line for resetting to zero, as well as an overflow line to indicate that the counter has overflowed. While shown conceptually as hardware counters, it will be appreciated that these counters will normally be registers in the writeable control storage 7 of the storage control unit 5 of FIG. 2. Each time a particular operation which is being counted occurs, that section, or register, of the control storage for that particular logical device is incremented by one or more, depending on the operation. That is, the error counters will be incremented once for each type of error encountered and the usage counters will be incremented to reflect the usage, i.e., the number bytes read and access motions.

Storage control units such as those seen in the patent to Harmon and the patent of Day, typically have arithmetic and logic units which perform, inter alia, incrementation. Thus, each time a particular operation pertinent to the counter occurs, the register accumulating the count is read out and incremented in the arithmetic and logic unit and read back into the writeable control storage. An exemplary layout of writeable control storage for eight logical devices is seen conceptually in FIG. 4. From FIG. 4 it can be seen that there is an area or register for each logical device for accumulating the information desired and this information is further identified by physical drive ID which could be, for example, in three out of six code.

The subsystem thus maintains a statistical data record of usage and error information for each logical device in the subsystem. The usage information provides an accumulated count of the total number of access motions and data bytes read. The error information provides an accumulated count of the total number of seek errors, ECC correctable data errors, and ECC uncorrectable data errors.

The usage error information is off-loaded, ultimately to be stored in storage means 43, each time one of the usage or error counters reaches a predetermined threshold such as described above. The vehicle for off-load can be, for example, a control unit generated Unit Check condition on the next Start I/O issued to the device with outstanding usage/error information. The start I/O command is well known in the art as can be seen by the Moyer, et al., and King, et al., patents cited above. Also, suitable commands are provided from the channel to allow the using system to off-load the usage/error information at end of day or preceding a pack change.

The usage/error statistics in the counters are reset under the following conditions: (a) after the counter information is transferred to the channel following counter threshold overflow detection, or (b) after the counter information is transferred to the channel after end of day or pack change operations, or (c) whenever the control unit detects a change in the physical drive ID associated with a logical device address (i.e., a logical address plug designation is switched from one physical drive to another).

If any one of the error counters reaches its threshold before its respective usage counter reaches its threshold, the control unit is conditioned to established error logging mode. While in error logging mode, after the usage/error information has been off-loaded, the control unit proceeds to log detailed diagnostic sense information for the next four errors, for example, of the type that established error logging mode. It will be appreciated that the number of logs may vary from system type to system type, depending on system needs. In logging mode, the control unit records detailed diagnostic information during the execution of control unit command retry or during the execution of error correction on ECC correctable data checks in the data field portion of the record. The information is transferred to the channel as a result of the control unit 5 signalling Unit Check in response the next Start I/O addressed to the device for which logging mode is established. After sense information for four separate recoverable error conditions has been transferred to the system, the control unit terminates logging mode for the device for which this mode was established.

Figure 5:
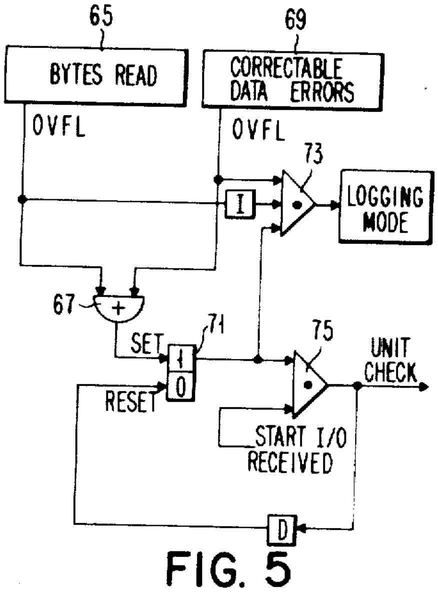
FIG. 5 is a representation of the manner in which the system is informed that an intolerable number of errors has occurred for a given physical volume.

This type of operation can be seen from FIG. 5 for the example of ECC correctable data errors. Bytes read counter 65 and ECC correctable error counter 69 are initialized so as to overflow when their respective thresholds have been reached. If the correctable data error counter 69 or the bytes read counter 65 overflow, Or 67 sets the one side of latch 71 to enable And 75. The next time a Start I/O is received for this device, a unit check signal is generated. The unit check is also used, after suitable delay, to reset latch 71. Also, if counter 69 has overflowed and counter 65 has not overflowed, this indicates that the correctable data error counter 69 has reached its threshold before the bytes read counter has reached its threshold and the output of And 73 initiates logging mode and offloads the statistical usage/error information to the system. That is, it off-loads the number of seeks and bytes read, and the number of seek errors, ECC correctable errors and ECC uncorrectable errors. It will be appreciated that this can be embodied in microprogramming by one of ordinary skill in the microprogramming art.

Figure 6A:
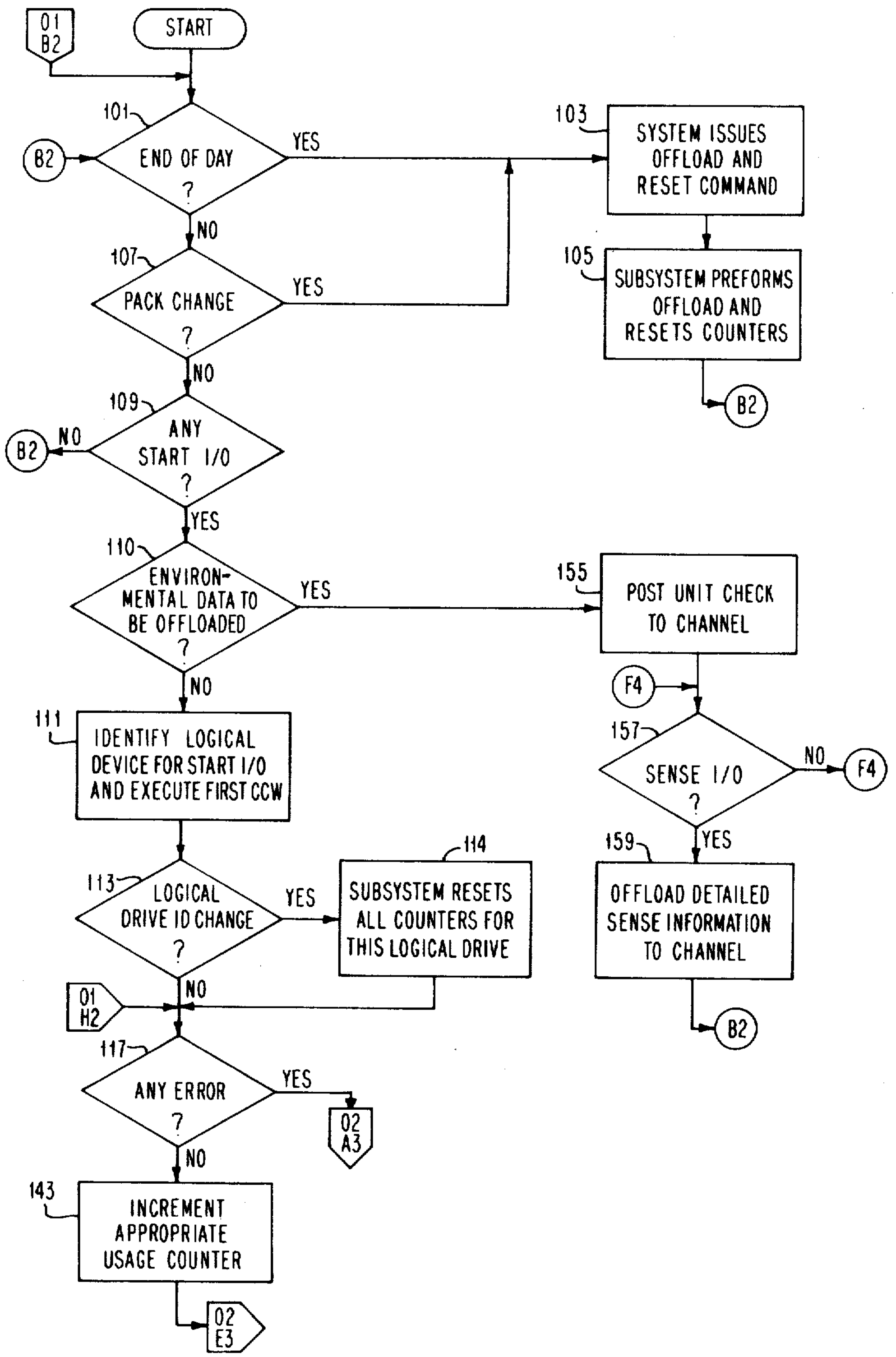
FIGS. 6A and 6B are flowcharts illustrating the method of our invention.
Figure 6B:
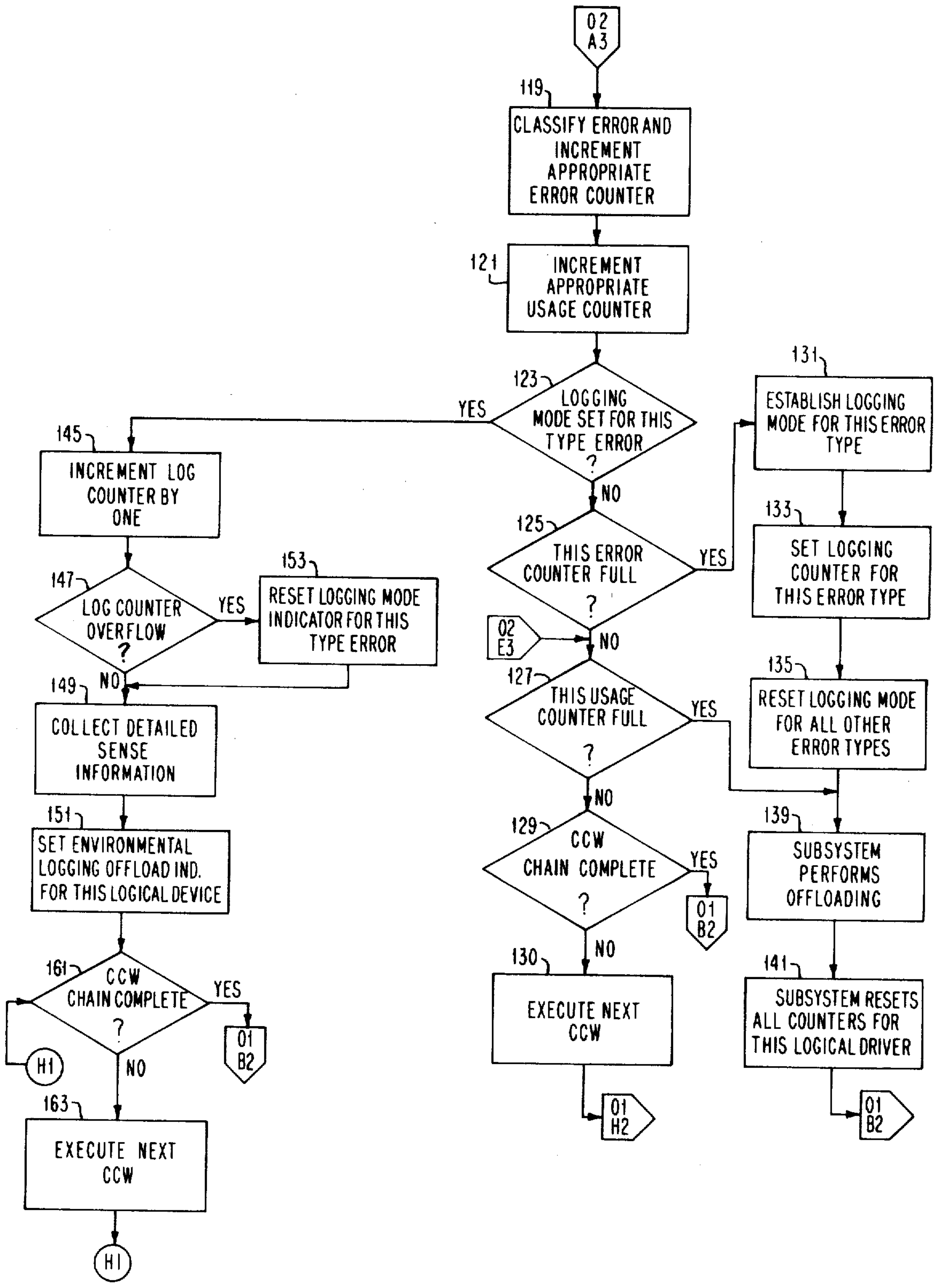

The method of our invention is seen broadly in FIGS. 6A and 6B, with regard to each operation for any given logical drive. The system tests to determine if the end of the processing day has occurred for the given drive. This is done at 101 in FIG. 6A. Physically this is done by the CPU testing for an end-of-day indication in CPU main storage. If end of day is about to occur, the operator so indicates by entering an end-of-day signal into the system storage at 25 of FIG. 2 via the operator console device. If end-of-day is detected, the CPU issues an off-load and reset command as at 103 which causes the control unit to off-load the usage/error information for the physical drive and volume ID to the channel, from which it is transferred to the CPU and ultimately to Storage 43. At the time when off-loading occurs as at 105, the values of the usage and error counters, as well as the physical drive address for the logical drive addressed by the system are read from portion 11 of writeable control store 7 of FIG. 2 to the logical device table for that logical device in main storage. Sometime prior to the preceding operation, at the time the drive was brought on line and made available to the system, the system issued a string of CCW's to cause the drive to seek to track 0, cylinder 0 and read the volume ID, V, for the volume and place it into section 35 of the main storage. It is, therefore, in storage section 35 at the time off-loading occurs so that the statistical information is identified both by physical drive ID and by volume ID. Subsequent to off-loading, all counters are reset as at 105 for that drive in writeable control storage of the control unit 5.

If end of day is not detected at 101, then a test is made for a pack change as at 107. If a pack is dismounted from the drive, a signal indicating such can be tested. When such signal is detected, it is assumed that the logical ID of the drive is going to change and/or that the volume on the drive is going to change. Therefore, it is necessary for the system to issue a off-load and reset command for that logical drive as at 103 which causes the control unit to off-load the data and again by physical drive address, volume ID, and to reset the counters for that logical drive.

If a pack change is not detected, a test is made in the control unit as at 109 to determine whether a Start I/O command has been issued. If no start I/O has been issued, the process begins again to check for end-of-day.

Figure 4:
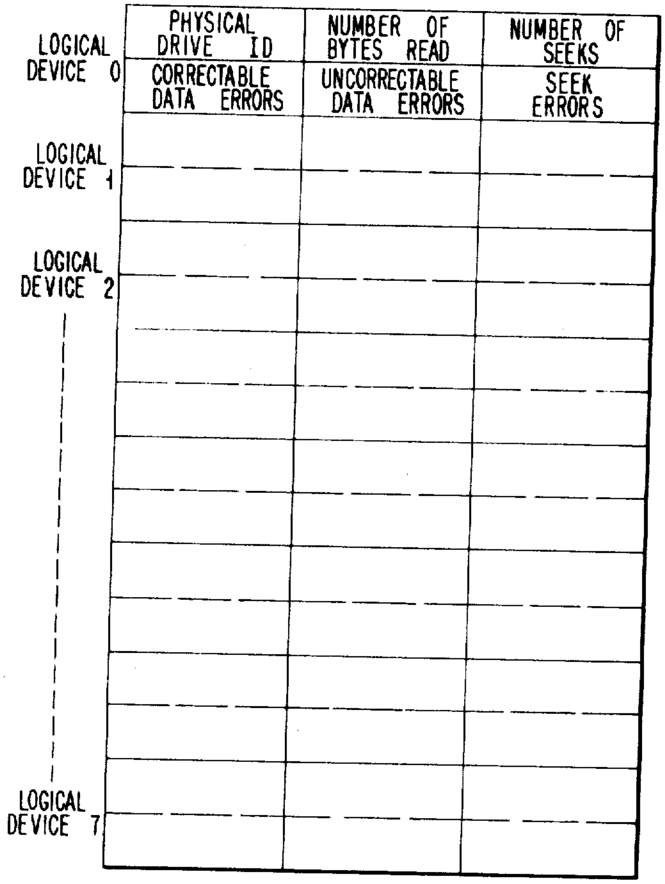
FIG. 4 is a representation of the manner in which the counters of FIG. 3 may be laid out in the writeable control storage in the storage control unit of the subsystem.

When a Start I/O is detected, a seek or a chain of data transfer operations is normally to take place. However, first it is necessary to determine whether environmental data is to be off-loaded due to the subsystem being in logging mode from a previous operation. This is done at 110. For now it is assumed that no environmental off-loading is to take place. Hence the logical device for which the detected Start I/O is addressed is identified as at 111 and the area of the writeable control store containing the statistical information for that logical device is brought into operation. The first CCW is then executed. After each selection, it is necessary to check for a logical drive ID change, since if the logical drive ID has been changed to another physical drive since the last operation to this logical drive, it is necessary to reset the statistical usage/error counters for this logical drive lest inaccurate information for the new physical drive ID associated with the currently addressed logical drive be obtained. This is done as at 113. A process for detecting a logical drive ID change is as follows. When the Start I/O address is identified, the current physical drive ID for the addressed logical drive is obtained. It will be recalled that U.S. Pat. No. 3,453,567, cited above, showed one example for a logical address plug for a device of the type under discussion. If the logical drive ID has been changed, the plug will have been changed such that the line activated in FIG. 4 of the patent is changed. Each of the lines of that FIG. 4 can be used to activate an address emitter. For example, each line could be used as an input to a device which emits an address in three out of six codes. Each address would be unique for each of the eight drives on line. Thus, the three out of six code address from the logical drive could be gated into the control unit and compared to the physical drive ID stored in the area of control store 5 dedicated to the currently addressed logical drive as seen in FIG. 4 of this application. If the two are the same it means that the logical ID has not changed and counting can continue for this operation. If the two are disimilar then the counters must be reset as at 114 in FIG. 6, the new physical ID is inserted in the dedicated area, and then the counting can begin for the operation indicated by this start I/O operation.

On the other hand, if no logical device ID change is detected at 113, errors are monitored as at 117. If an error is encountered, it is classified as to type (seek, ECC correctable, ECC uncorrectable) as at 119 of FIG. 6B. The appropriate error counter is incremented. Also, the appropriate usage counter is incremented as at 121 to reflect an increase of one in the number of seeks if a seek error has been encountered, or the increase in the number of bytes read if the error is an ECC correctable or ECC uncorrectable data error.

It may be that logging mode has been established for this logical drive and this type of error. If so, detailed sense diagnostic information must be collected. Hence a test for logging mode is made at 123 of FIG. 6B. This can be done by testing a logging mode indicator, to be discussed subsequently, for this type error. However, for the present example, it will be assumed that logging mode has not yet been established. Therefore, a test is made at 125 to determine whether the error counter for this type of error is full. This can be done by testing the overflow explained previously. If the error counter is not full, then a test is made at 127 to determine whether the appropriate usage counter is full. If not, a test is made at 129 to detect whether the CCW chain is complete, if the system is currently command chaining. If there is no command chain in progress, this step can be skipped and the method proceeds to 101 of FIG. 6A. If the system is chaining and the chain is complete, then the method returns to 101 and begins again. If the chain is not complete, then the next CCW is executed and the method reverts to monitoring as previously described and the process continues.

STATISTICAL USAGE/ERROR OFFLOADING AND ESTABLISHING ERROR LOGGING MODE

If the test at 125 of FIG. 6B indicated that the error counter was full, then the statistical information must be off-loaded to the system and logging mode established. Logging mode is established as seen at 131. This can be done by setting a logging mode indicator, for this type error and this logical device, which can be tested. Also, a logging counter, such as a register in control store, is set as at 133 to overflow at 4 to count the number of times detailed diagnostic sense information is collected. Also, as seen at 135, the logging mode indicators for other types of errors are reset or turned off. This is so since it is desired to have logging mode established for only one type of error at a time on one logical drive. Hence the establishment of logging mode for one type of error extinguishes logging mode for any other type of error. It will be appreciated that it is within the skill of the ordinary worker in the microprogramming art to proceed with logging mode for all types of errors simultaneously, without departing from the spirit or the scope of the invention. However, it has been found in practice that the condition in which two or more error types overflow their respective errors counters concurrently is so rare that providing for logging mode for more than one type of error at a time is uneconomical.

The subsystem then performs the off-load of the information for the logical device by physical ID and volume ID as explained above, as seen at 139 of FIG. 6B. This can be done by giving a Unit Check to the next start I/O to this logical device. When the channel responds with sense I/O the statistical information is off-loaded. The counters are reset as at 141 and operation begins again.

If, on the other hand, the error counter does not overflow, the appropriate usage counter is checked to determine whether it is full as seen at 127 of FIG. 6B. If the usage counter is full then the subsystem again performs the off-load as above and resets the counters.

ENVIRONMENTAL DATA LOGGING MODE

Environmental data logging mode will now be described for the three types of errors of which the system is cognizant, it being understood by those of ordinary skill in the art that the system could, of course, be cognizant of other types of errors, depending upon the needs of the system.

ECC CORRECTABLE DATA ERRORS

When logging mode is established for ECC correctable data errors, the storage control unit collects environmental, or diagnostic sense information from various key areas of the subsystem, for the next four times that an ECC correctable data error is encountered at the logical drive for which this information is assembled into records stored in the writeable control storage of FIG. 2. After each record is assembled it is off-loaded to the system as described previously, for transmission to storage means 43 of FIG. 2. This information may be summarized in Table 1 below.

TABLE 1

| Item | Information |
|---|---|
| 1 | Physical Control Unit Number and Physical Drive ID of the subsystem which is attempting to read the record |
| 2 | Area of Data Record Corrected (home address, count, key, data) |
| 3 | Cylinder Address |
| 4 | Head Address |
| 5 | Record Number |
| 6 | Sector Number at which record in error was encountered |
| 7 | How far the access was offset when the corrected data was read |
| 8 | Number of bytes processed by the control unit between initiation of data transfer and the end of the information field in error |
| 9 | Location of the first byte in error in the information field relative to the end of the information field |
| 10 | Error Correction Pattern |
| 11 | Whether the channel truncated the operation on which the correctable error was encountered while the information was being read |

As mentioned previously, most of the above information can be obtained directly from the record in error, on the track. The physical control unit and drive ID can be obtained from the control unit and the drive as was done above, while the sector number can be obtained from a register storing that number, as seen in the above cited co-pending application relative to sector storage. The access offset can likewise be obtained from a register storing that number. The number of bytes processed by the control unit between initiation and data transfer and the end of the information field in error can be obtained merely by counting the number of bytes processed from the beginning of data transfer until such areas indicated, by any means well known to those of ordinary skill in the art. This could be done by well known hardware counters or by setting up a microprogram loop in the writeable control store. Finally, the channel truncation operation can be gathered as a statistic merely by monitoring a line from the channel which indicates that the operation has been truncated for some reason such as priority interrupt, or the like.

ECC UNCORRECTABLE DATA ERRORS

The following is the environmental information gathered for the situation in which environmental logging mode is initiated due to the ECC uncorrectable data error counter overflowing.

TABLE 2

| Item | Information |
|---|---|
| 1 | Physical Control Unit Number and Physical Drive ID of the control unit and drive attempting to read the record |
| 2 Type of Error and in what field encountered — | home address — ECC uncorrectable<br>count — ECC uncorrectable<br>key — ECC uncorrectable<br>data — ECC uncorrectable<br>home address — synchronization error<br>count — synchronization error<br>key — synchronization error<br>data — synchronization error<br>address mark detection failure on retry |
| 3 | Cylinder Address |
| 4 | Head Address |
| 5 | Record Number |
| 6 | Sector Number at which record in error was encountered |
| 7 | How far access was offset when data became correct or correctable |
| 8 | The number of control unit retries that were required in processing the error condition |
| 9 | The source drive ID — that is, the identification of the physical control unit and drive that actually recorded the area in which the error was detected. |

This information can be collected as mentioned previously. That is, by interrogating registers within the drive or control unit wherein such information is stored.

The source drive ID can actually be recorded with the data area when it is written. This ID is then obtained by reading it directly from the data area in which the data error is detected.

SEEK ERRORS

The following is the type of information collected under environmental logging for Seek errors.

TABLE 3

| Item | Information |
|---|---|
| 1 | Control Unit Number and Physical Drive ID of the control unit and drive attempting to execute the seek |
| 2 | Error is a Seek Error |
| 3 | Manner of detection of Seek Error |
| 4 | Contents of control bus from the control unit to the drive at the time of error |
| 5 | Contents of control bus from the drive to the control unit at the time of error |
| 6 | Contents of control information modifying information on the busses in the previous two items |

All of the above information in Table 3 is self explanatory with the exception of item 3. The manner of detection of a seek error could be by a line from the drive which indicates that the seek was incomplete. Alternatively, there could be a data pattern recorded on the data track which indicates the seek address of the track. This address could then be compared with the seek address to which the access mechanism was to be translated. If the two do not agree when the access is stopped, this also indicates a seek error. Thus, item 3 will indicate which of these (or perhaps that both of these) was the manner in which the seek error was detected.

LOGGING

Logging can be seen relative to the method chart of FIG. 6B. When logging mode is established at 131, then the next time this type of error is detected for this logical drive, the test at 123 will detect the presence of the logging mode indicator. It will be recalled that the logging mode counter has been set previously at 133, such that it will overflow during the fourth time that detailed sense information is collected for a particular type of error. During logging mode the log counter is incremented by one as seen at 145 each time detailed sense information is collected. At 147, a check is taken to determine whether the log counter was overflowed. If it has, this is the last time through the loop and the logging mode indicator for this type of error is reset as seen at 153. Thereafter, detailed sense information is collected (for the last time) as seen at 149. On the other hand, if the log counter has not overflowed, this means that the fourth and last collection of detailed sense information is not occurring and collection should be undertaken immediately as in 149. When the sense information has been collected and stored in the control store, an environmental logging off-load indicator is set at 151 indicating that this environmental record is to be off-loaded on the next start I/O to the subsystem. When the next start I/O is detected at 109 of FIG. 6A, the environmental off-load test at 110 will be successful and unit check is posted in the status response to the channel as seen at 155. The channel will then respond with a sense I/O and when that is detected at 157 the detailed sense information is off-loaded to the channel as at 159 and from thence is sent to the CPU where it will ultimately be collated by physical drive and volume ID and stored in storage device 43.

SUMMARY REPORTING

At predetermined times, for example at the end-of-day, summary reports of the performance of the system are given in terms of the usage/error information and environmental information collected. The environmental data such as that seen in Table 1, 2 and 3 above is accessed from storage device 43 of FIG. 2 and is identified by physical drive ID and then by volume ID, and each environmental record is printed out. Thus, each physical drive will have associated with it the environmental data collected each time an error counter of the given type overflowed. This information will be useful to the maintenance engineer in the following ways.

Because this information is only collected in situations where one of the error counter thresholds has been reached, it is useful in focusing the maintenance engineer's attention on a potential problem requiring maintenance action.

With detailed error information such as that shown in Tables 1, 2 and 3, at hand, the maintenance engineer can effectively use his documented maintenance procedures which depend on this detailed information as a prerequisite to effective use, to isolate and repair worn or intermittently failing machine components.

Figure 7:
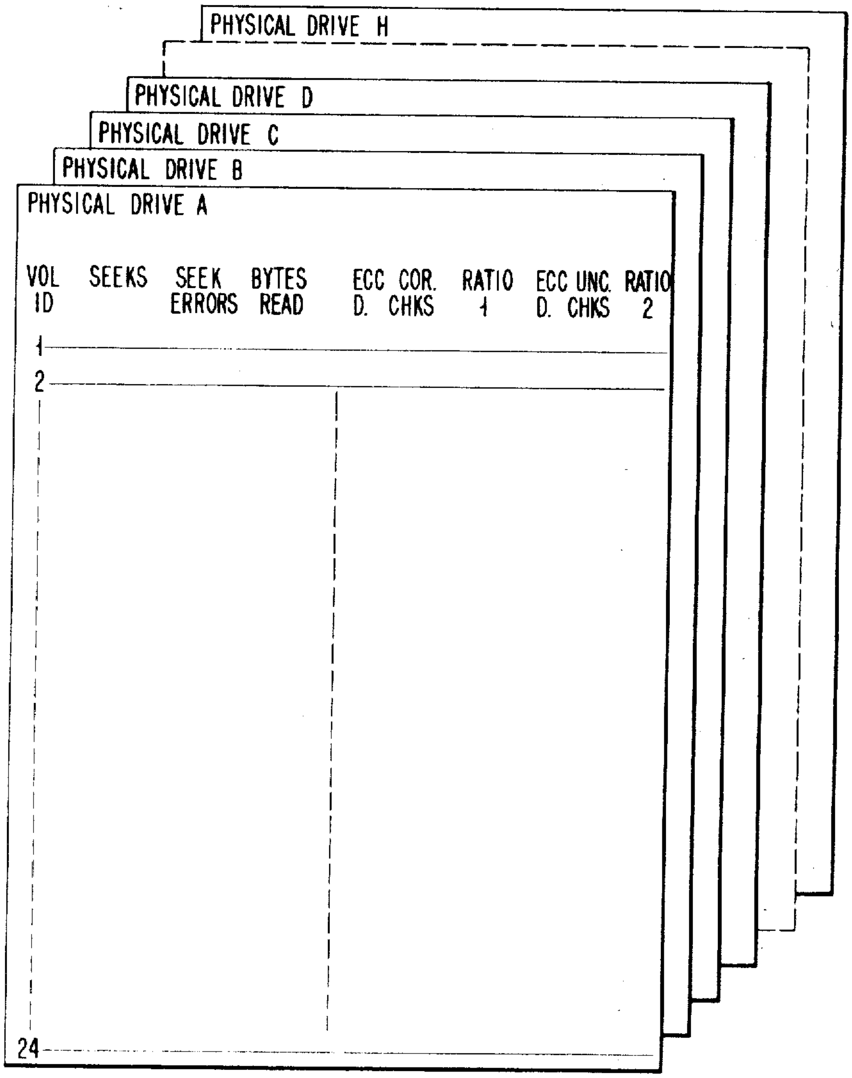
FIG. 7 is an illustration of a summary record useful in our invention.

A second type of record summary is the statistical record. It will be recalled that all counter information was off-loaded for a drive whenever end-of-day occurred, a pack was changed or a counter overflowed. This information can then be sorted and merged using any well known sort/merge program and printed out as a summary record as seen in FIG. 7. In that figure it can be seen that records are printed out by physical drive address and also by volume ID. For the current example it is assumed that a physical drive can have as many as 24 volumes associated with it at different times. Therefore, the statistical information which was stored in the writeable control store is sorted and collated and printed by volume ID. It will be seen from FIG. 7 that two ratios are given as part of the statistical record. Ratio 1 is the ratio of bytes read to ECC correctable data checks and ratio 2 is the ratio of bytes read to ECC uncorrectable data checks. Thus, when the maintenance engineer studies the record summary, if a particular physical drive has a ratio for either ratio 1 or ratio 2 which is lower than a given threshold of expected bytes read per error of the type under study, then the drive becomes suspect of possible wear or hazard conditions. This suspicion may be resolved by noting the volume ID's for a particular physical drive, for example, physical drive A, which have ratios lower than expected. These volume ID's can then be scanned on the records for the other physical drives. If it turns out that the volume ID's have low ratios only for drive A, for example, then the suspicion that drive A is the problem, as opposed to the volume being the problem, is more nearly confirmed. If, on the other hand, it is determined by scanning the records that the noted volume ID's have consistently low ratios for all drives, then the suspicion that the volumes have problems, such as media wear, or the like, is more likely correct. Thus, with the invention as disclosed, a powerful tool has been given for the maintenance engineer in data processing systems. This information can be stored on a history table for printout at more manageable times on, for example, a monthly basis.

While the invention has been particularly shown and described with reference to a preferred embodiment thereof, it will be understood by those skilled in the art that the foregoing and other changes in form and details may be made therein without departing from the spirit and scope of the invention.

We claim:

1. In a data processing subsystem having storage devices identified by physical address and logical address, said devices having associated therewith portable storage volumes identified by volume identifier, said system for performing operations having associated therewith usage parameters and error parameters, the method of collecting statistical data comprising the steps of:

associating a threshold number to each of said usage parameters for each said physical device having associated therewith an identified storage volume;

associating a threshold number to each of said error parameters for each said physical device relative to at least one of said usage parameters having associated therewith an identified storage volume;

counting the number of occurrences of said usage parameters for each physical device having associated therewith an identified storage volume;

counting the number of occurrences of said error parameters for each physical device having associated therewith an identified storage volume;

detecting, for each physical device and the storage volume associated therewith, at least one of said error parameters reaching its established threshold prior to said at least one usage parameter relative to which said threshold number of said error parameter was established reaching its threshold; and transmitting, in response to said detection, said counted number of occurrences of said usage parameters and said error parameters for each physical device and associated identified storage volume for which said detection was accomplished, to a storage area.

2. The method of claim 1 further including the steps of:

detecting, for each physical device and the identified storage volume associated therewith, at least one of said usage parameters reaching its threshold before any of said error parameters reaches its threshold; and transmitting, in response to said detection of said at least one of said usage parameters reaching its threshold before any of said error parameters reaches its threshold, said counted number of occurrences of said usage parameters and said error parameters for each physical device and storage volume, to said storage area.

3. The method of claim 1 further including the steps of:

collecting in at least one storage area, in response to said detection, detailed diagnostic sense information the next predetermined number of times the type of error causing said detection is encountered, from the physical device causing said detection; and transmitting said detailed diagnostic sense information to said storage area.

* * * * *